United States Patent
Sahinoglu et al.

(10) Patent No.: US 8,284,098 B2
(45) Date of Patent: Oct. 9, 2012

(54) PERSYMMETRIC PARAMETRIC ADAPTIVE MATCHED FILTERS FOR DETECTING TARGETS USING SPACE-TIME ADAPTIVE PROCESSING OF RADAR SIGNALS

(75) Inventors: Zafer Sahinoglu, Boston, MA (US); Pu Wang, Ridgefield, NJ (US); Man-On Pun, Jersey City, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 28 days.

(21) Appl. No.: 12/954,254

(22) Filed: Nov. 24, 2010

(65) Prior Publication Data

US 2012/0127027 A1 May 24, 2012

(51) Int. Cl.
*G01S 13/00* (2006.01)
(52) U.S. Cl. ........................................................ 342/189
(58) Field of Classification Search .................... 342/189
See application file for complete search history.

(56) References Cited

U.S. PATENT DOCUMENTS
6,091,361 A * 7/2000 Davis et al. ................... 342/378

OTHER PUBLICATIONS

Cai et al. "A Persymmetric Multiband GLR Algorithm". IEEE Transactions on Aerospace and Electronic Systems. vol. 28, Issue 3. Jul. 1992. pp. 806-816.*
De Maio, Antonio. "Maximum Likelihood Estimation of Structured Persymmetric Covariance Matrices". Signal Processing. vol. 83, Issue 3. Mar. 2003. pp. 633-640.*
Nitzberg, Ramon. "Application of Maximum Likelihood Estimation of Persymmetric Covariance Matrices to Adaptive Processing". IEEE Transactions on Aerospace and Electronic Systems. vol. AES-16, Issue 1. Jan. 1980. pp. 124-127.*
PaillouX et al. "On Persymmetric Covariance Matrices in Adaptive Detection". IEEE International Conference on Acoustics, Speech and Signal Processing, 2008. May 12, 2008. pp. 2305-2308.*

* cited by examiner

*Primary Examiner* — John B Sotomayor
*Assistant Examiner* — Matthew M Barker
(74) *Attorney, Agent, or Firm* — Dirk Brinkman; Gene Vinokur

(57) ABSTRACT

A method provides space-time adaptive processing (STAP) for target detection using adaptive matched filters (AMF). A generalized likelihood ratio test (GLRT) is determined where spatial and temporal correlation matrices Q and A are assumed. Then, the correlation matrices A and Q are replaced with maximum likelihood (ML) estimates obtained only from training signals subject to a persymmetric constraint.

1 Claim, 7 Drawing Sheets

US 8,284,098 B2

PERSYMMETRIC PARAMETRIC ADAPTIVE MATCHED FILTERS FOR DETECTING TARGETS USING SPACE-TIME ADAPTIVE PROCESSING OF RADAR SIGNALS

FIELD OF THE INVENTION

This invention relates generally to signal processing, and in particular to space-time adaptive processing (STAP) for target detection using adaptive matched filters (AMF) applied to radar signals.

BACKGROUND OF THE INVENTION

Space-Time Adaptive Processing

Space-time adaptive processing (STAP) is frequently used in radar systems to detect a target. STAP has been known since the early 1970's. In airborne radar systems, STAP improves target detection when disturbances in an environment, e.g., noise, ground clutter and jamming, are a problem. The disturbances can be Gaussian or non-Gaussian. STAP can achieve order-of-magnitude sensitivity improvements in target detection.

Typically, STAP involves a two-dimensional filtering technique applied to signals received by a phased-array antenna with multiple spatial channels (antennas). Coupling the multiple spatial channels with time dependent pulse-Doppler waveforms leads to STAP. By applying statistics of interference of the environment, a space-time adaptive weight vector is formed. Then, the weight vector is applied to the coherent signals received by the radar to detect the target.

STAP Detector Filter

As shown in FIG. 1 for conventional STAP, observations include a test signal 101, a set of training signals 102, and a steering vector 103. In a homogeneous environment, the test signal shares the same covariance matrix with the training signals.

It is a known problem to detect a moving target from a moving platform in many applications including radar, wireless communications, and hyperspectral imaging acquired across the entire electromagnetic spectrum. STAP can to deal with strong spatially and temporally colored disturbances.

However, the conventional STAP is not suitable for many from practical applications due to excessive training requirements and a high computational complexity, for example, a covariance-matrix-based STAP detectors, which need K, $J_N$ training signals to ensure a full-rank estimate of the disturbance covariance matrix and have to invert a JN×JN matrix, where J denotes the number of antennas and N denotes the number of pulses.

As shown in FIG. 1, by modeling the disturbance as a multichannel auto-regressive (AR) process, a parametric STAP detector 100 decompose jointly spatio-temporal whitening of the covariance-matrix-based detectors into successive temporal 110 and spatial 120 whitening by using the estimate of the temporal correlation matrix A 130, and a spatial covariance matrix Q 140, given the test signal 101, training signals 102 and a steering vector 103, where $(.)^H$ 145 indicates a Hermitian transpose.

The results of the spatial whitenings 120 are multiplied 149 by each other to produce corresponding sums $\Sigma_{n=P}^{N-1}(.)$ 150, for which the magnitudes $|.|^2$ 170 are determined. The magnitudes are divided (/) 175 into each other to determine the test statistic $T_{PAMF}$ 180 of the parametric adaptive matched filter (PAMF). The test statistic 180 is compared to a threshold 190 to obtain a decision 195 whether a target is present or not in the test signal.

Matrix Estimation

As shown in FIG. 2, an estimated temporal correlation matrix A 130 and an estimated of spatial correlation matrix Q 140 are determined 200 as follows:

a regression vector $y_k(n)$ 215 is constructed 210 from the training signals $x_k(n)$ 102;

using the training signals 102, an estimate of an autocorrelation of the training signal $\hat{R}_{xx}$ 220 is determined;

using the training signals and the regression vector, an estimate of a cross correlation of $y_k(n)$ 215 and $x_k(n)$ 102 is determined 240; using the regression vector 215, an estimate of an autocorrelation $\hat{R}_{yy}$ is determined 230;

an estimate of the spatial covariance matrix Q 140 is determined 250 as $$\hat{Q} = \frac{\hat{R}_{xx} - \hat{R}_{yx}^H \hat{R}_{yy}^{-1} \hat{R}_{yx}}{K(N-P)}; \qquad 130$$

and an estimate of the autoregressive coefficient matrix 130 is determined 260 $\hat{A} = -\hat{R}_{yy}^{-1}\hat{R}_{yx}$.

SUMMARY OF THE INVENTION

The embodiments of our invention take advantages of both a multichannel-AR-based parametric adaptive matched filter (PAMF), and an underlying persymmetry constraint to provide a persymmetric PAMF (per-PAMF).

Our per-PAMF is a two-step method.
1) First, we determine a generalized likelihood ratio test (GLRT) where spatial and temporal correlation matrices Q and A are assumed to be known.
2) Then, we replace the correlation matrices A and Q with maximum likelihood (ML) estimates obtained only from training signals subject to the persymmetric constraint.

DETAILED DESCRIPTION OF THE PREFERRED EMBODIMENTS

Overview

Figure 3:
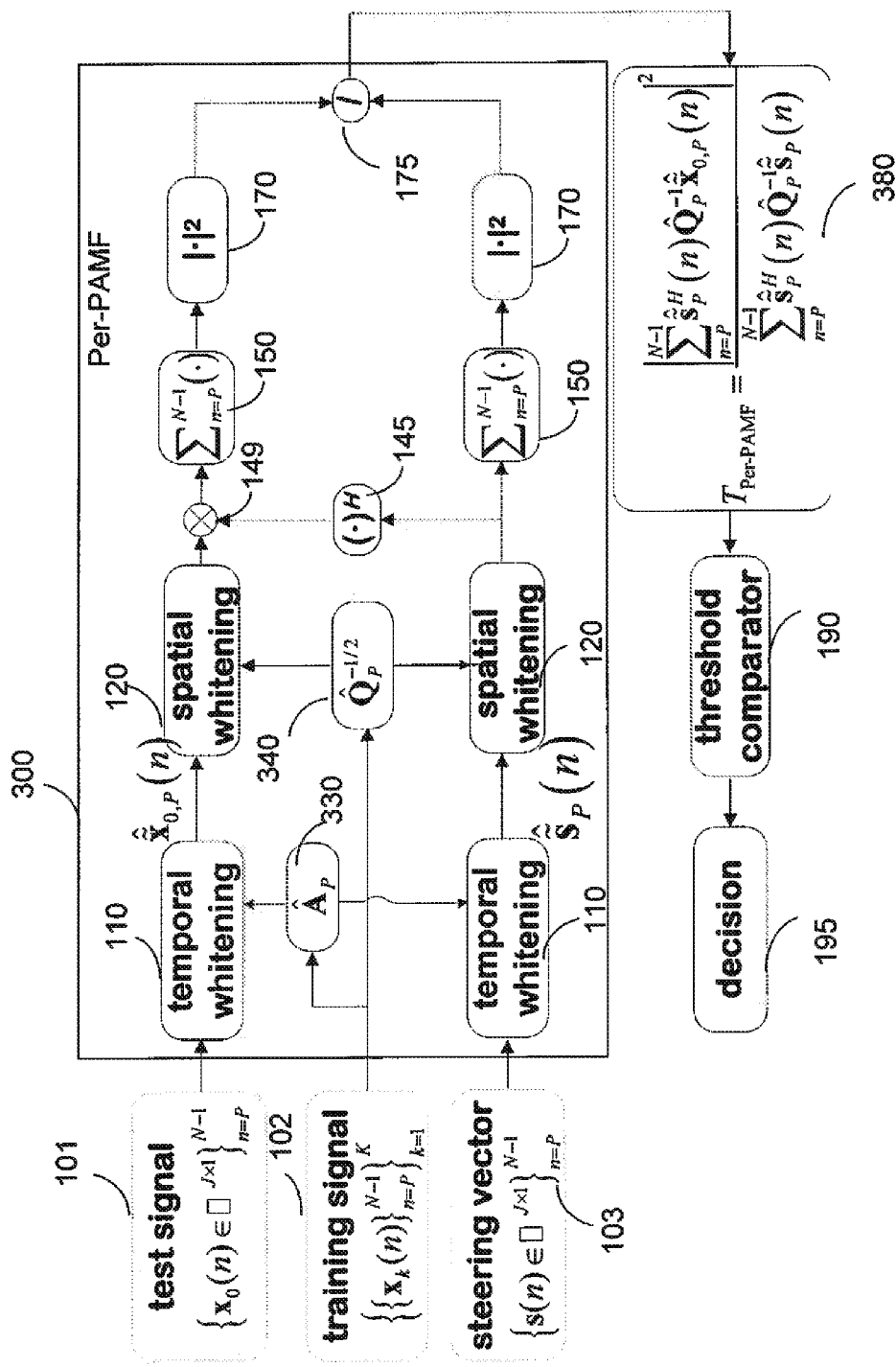
FIG. 3 is a block diagram of a persymmetric parametric adaptive matched filter (per-PAMF with adaptively estimated temporal and spatial covariance matrices according to embodiments of the invention.

As shown in FIG. 3, the embodiments of our invention provide a persymmetric parametric adaptive matched filter (per-PAMF) 300 with an adaptively estimated temporal correlation matrix A 330 and an adaptively estimated spatial covariance matrix Q 340 obtained from training signals 302.

Figure 1:
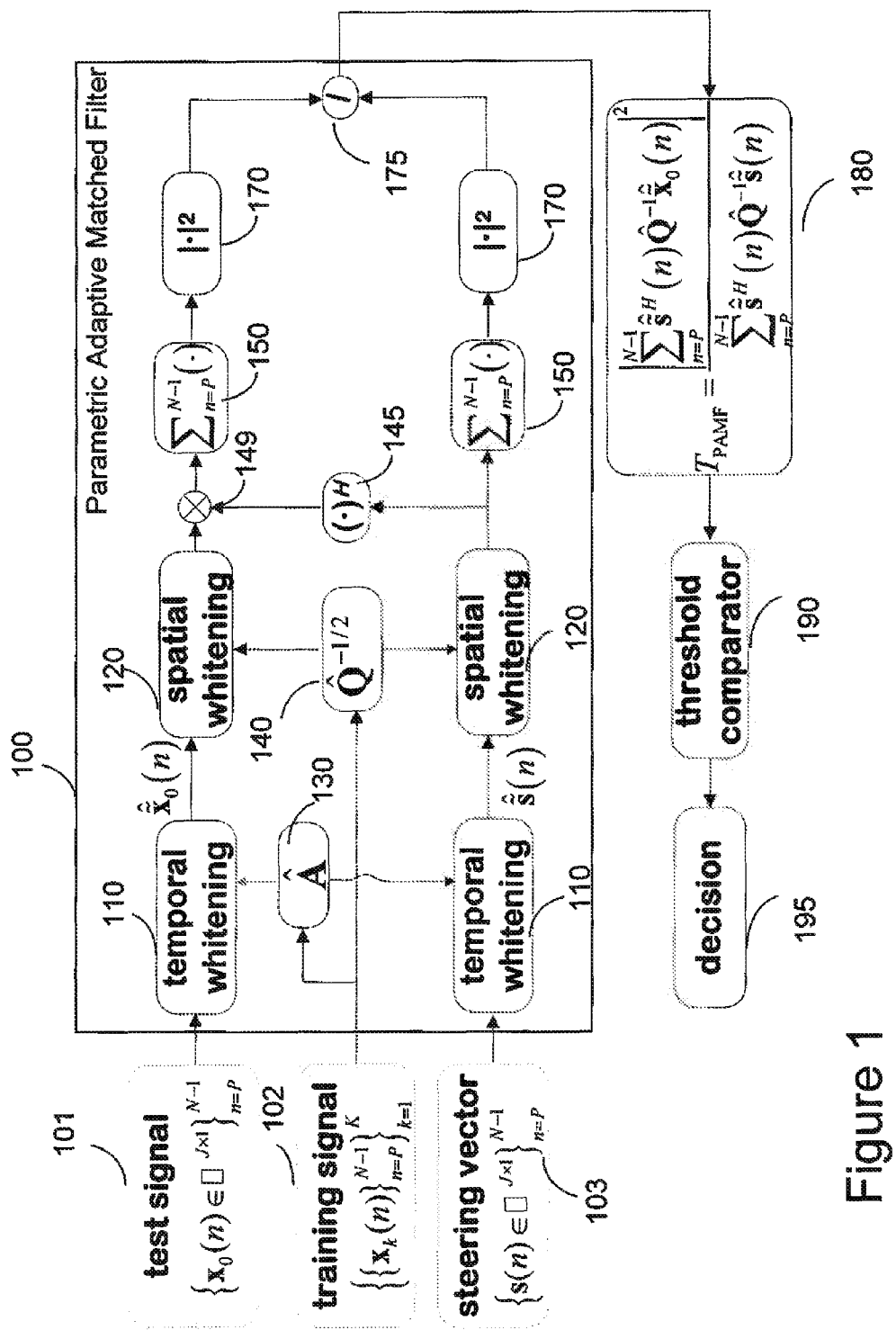
FIG. 1 is a block diagram of a conventional parametric adaptive matched filter (PAMF)

The filter can also be implemented as a method performed in a processor connected to a memory and input/output interfaces as known in the art. As can be seen the general structure of our filter 300 is similar to the conventional filter 100 shown in FIG. 1.

The AMD 300 filter can be used to detect targets using space-time adaptive processing (STAP) of test signals 301, and a generalized likelihood ratio test (GLRT).

Differences from Prior Art

Figure 2:
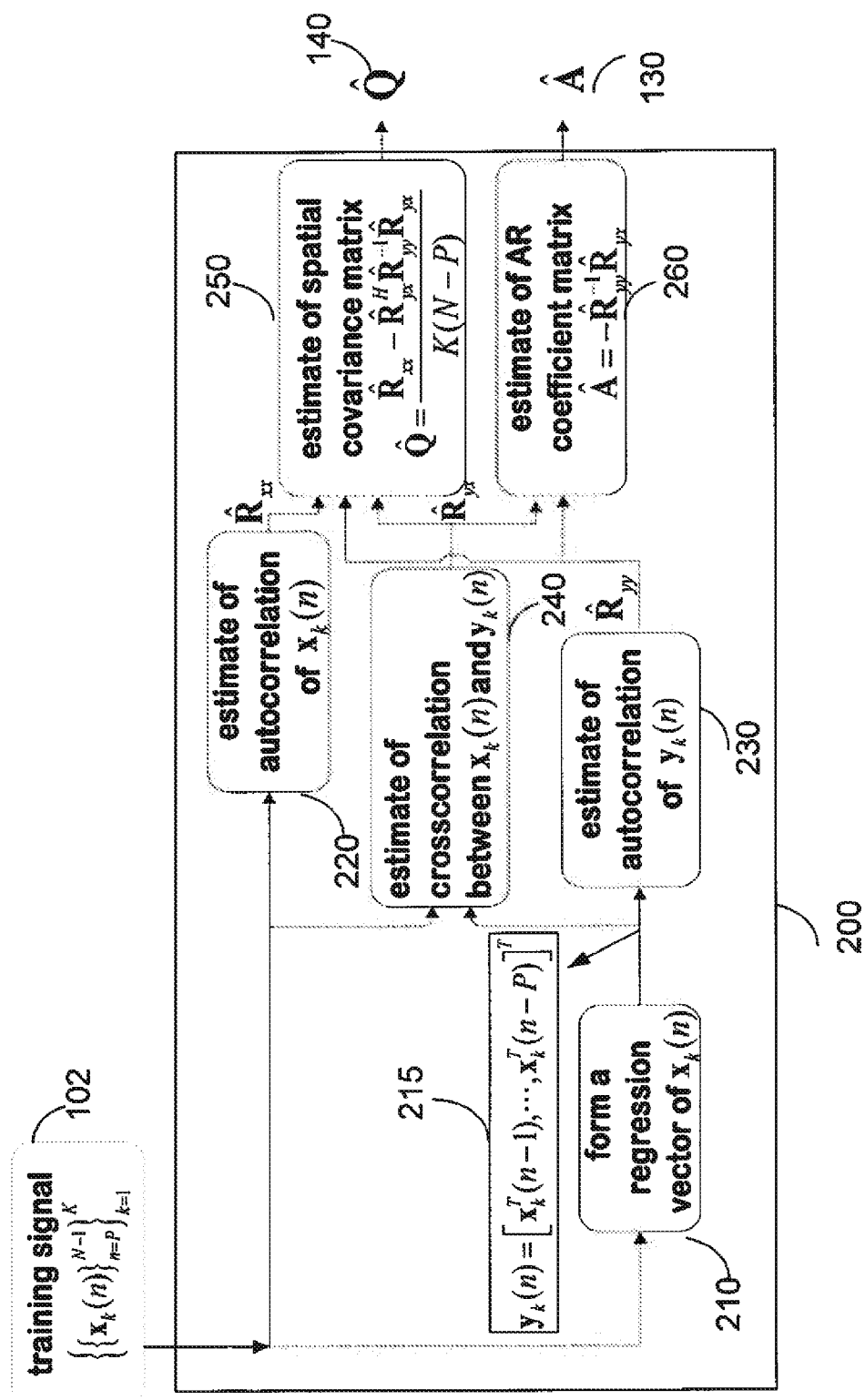
FIG. 2 is a block diagram 200 of a procedure for estimating a temporal covariance matrix A and a spatial covariance matrix Q.
Figure 4:
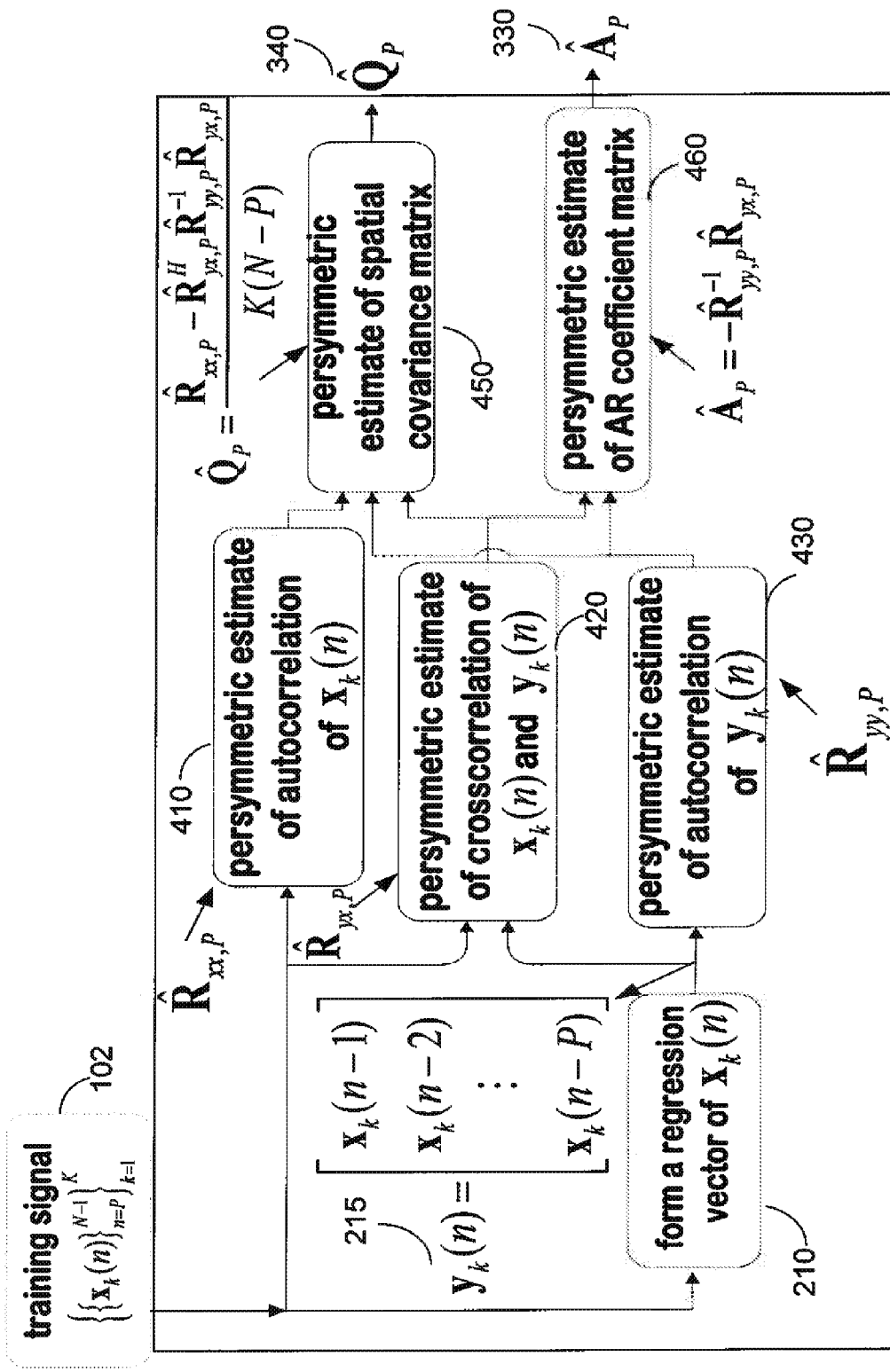
FIG. 4 is a block diagram of a procedure for estimating the temporal covariance matrix and the spatial covariance matrix according to embodiments of the invention.

The major differences are in how the matrices Q and A are estimated, and the resulting test statistic $T_{per\text{-}PAMF}$ from these two matrices, compare FIGS. 2 and 4.

Method Overview

Our per-PAMF method basically has two steps.

First, we determine a generalized likelihood ratio test (GLRT)

$$T = \frac{\max_{\alpha} p_1(x_0; \alpha, A, Q)}{p_0(x_0; A, Q)},$$

where $\{Pi\}_{i=0}^{1}$ are likelihood functions under a first hypothesis $H_0$ that the target is present and a second hypothesis $H_1$ that the target is not present, $\alpha$ is an unknown complex-values amplitude, $x_0$ is the test signal, and max is a function that evaluates to a maximum, and the spatial and temporal correlation matrices Q and A are known.

Second, we replace the correlation matrices A and Q with maximum likelihood (ML) estimates $\hat{Q}$ and $\hat{A}$ obtained from training signals subject to a persymmetric constraint.

Test Hypothesis

Specifically, we use the following hypothesis testing problem:

$H_0: x_0=d_0, x_k=d_k, k=1, \ldots, K,$ $H_1: x_0=\alpha s+d_0, x_k=d_k, k=1, \ldots, K,$ (1)

where the hypothesis $H_0$ is that the target is not present in the test signal $x_0$ 301, $H_1$ is the hypothesis that the target is present, $x_k$ are target free training signals 302, $x_0$ is the JN×1 test signal 301, which is a Kronecker (⊗) product between space and temporal steering vectors, s is a presumed known array response 303, $\alpha$ is an unknown complex-values amplitude, $d_0$ and $d_k$ are noise terms with covariance matrices $R_0$ and R, respectively.

Joint Decomposition

Like before, we jointly decompose spatio-temporal whitening of the covariance-matrix-based detector into successive temporal 310 and spatial 320 whitening by using the estimates of the temporal correlation matrix A 330 and a spatial covariance matrix Q 340, given the test signal 301, the training signals 302 and a steering vector 303, and where $(.)^H$ 145 indicates a Hermitian transpose.

The results of the spatial whitenings 320 are multiplied 349 by each other to produce corresponding sums $$\sum_{n=P}^{N-1} (.) \ 350,$$

for which the magnitudes $|.|^2$ 370 are determined, respectively. The magnitudes are divided (/) 375 into each other to determine our test statistic $T_{per\text{-}PAMF}$ 380. Finally, the test statistic 380 is compared to a threshold 390 to obtain a decision 395 whether a target is present or not in the test signal.

We decompose jointly the spatio-temporal whitening of the covariance matrix-based detectors into successive the temporal 310 and the spatial 320 whitening by using the estimate of the temporal correlation matrix A 330, and a spatial covariance matrix Q 340, given the test signal 301, the training signals 302 and a steering vector 103, an auto-regressive (AR) process.

Let $x_k(n) \in C^{J \times 1}$ 302 denote the $n^{th}$ temporal training signal given by $$x_k(n) = -\sum_{p=1}^{P} A^H(p) x_k(n-p) + \varepsilon_k(n) \qquad (2)$$

where $\varepsilon_k(n) \sim C\mathcal{N}(0, Q)$ is the $J^{th}$ channel (antenna), which is temporally white but spatially colored Gaussian noise with Q denoting an unknown J×J temporal correlation matrix. The antenna elements are placed symmetrically with respect to a phase center, e.g., the middle of the antenna element. Thus, the spatial covariance matrix is Q imposed to be persymmetric by satisfying Q=EQ*E, where E denotes an exchange matrix, which is 1 at anti-diagonal elements and 0 otherwise.

Persymmetry

As defined herein, and as known in the art, a square matrix is persymmetric when the matrix is symmetric about its upper right to lower left diagonal. Generally, this type of matrix is also known as a Hankel matrix with constant (positive sloping) skew-diagonals:

$$\begin{bmatrix} a & b & c & d & e \\ b & c & d & e & f \\ c & d & e & f & g \\ d & e & f & g & h \\ e & f & g & h & i \end{bmatrix}.$$

In the receiver, a tapped delay line with symmetrically spaced taps with respect to the mid delay value is used. In this case, temporal persymmetry occurs, that is $A(p)=EA^*(p)E$ If the temporal and spatial covariance matrices Q and A are known, then maximum likelihood estimates of the matrices $\hat{A}$ 330 and $\hat{Q}$ 340 are obtained from the training signals according to the invention.

Our processing of the training signals differs from the conventional processing because we exploit persymmetric properties of the covariance matrices A and Q, i.e., the square matrices are symmetric along their main diagonal.

Joint Likelihood

A joint likelihood of the training signals 302 can be written as $$p(x_1, \ldots, x_K; A, Q) = \left[\frac{1}{\pi^J |Q|} e^{-tr(Q^{-1}\Gamma_0)}\right]^{K(N-P)}, \quad (3)$$

where $$K(N-P)\Gamma_0 = \sum_{k=1}^{K} \sum_{n=P}^{N-1} \varepsilon_k(n)\varepsilon_k^H(n), \text{ and}$$

$$\varepsilon_k(n) = x_k(n) + \sum_{p=1}^{P} A^H(p)x_k(n-p).$$

Alternatively, $$K(N-P)\Gamma_0$$

can be written as $$K(N-P)\Gamma_0 = \hat{R}_{xx} + A^H \hat{R}_{yx} + \hat{R}_{yx}^H A + A^H \hat{R}_{yy} A,$$

where $$A \triangleq [A^H(1), A^H(2), \ldots, A^H(P)]^H,$$

$$\hat{R}_{xx} = \sum_{k=1}^{K} \sum_{n=P}^{N-1} x_k(n)x_k^H(n), \quad 421$$

$$\hat{R}_{yy} = \sum_{k=1}^{K} \sum_{n=P}^{N-1} y_k(n)y_k^H(n), \quad 431$$

$$\hat{R}_{yx} = \sum_{k=1}^{K} \sum_{n=P}^{N-1} y_k(n)x_k^H(n), \quad 441$$

and $y_k(n)$ is the regression vector 415 given by $$y_k(n) \equiv [x_k^T(n-1), x_k^T(n-2), \ldots, x_k^T(n-P)]^T$$

see FIG. 4.

By exploiting the persymmetric property of the matrix Q according to the invention, it is possible to write $$tr(Q^{-1}\Gamma_0) = tr\left(Q^{-1} \frac{\Gamma_0 + E\Gamma_0^* E}{2}\right).$$

This leads to the persymmetric estimate of the spatial matrix Q 340. As a result, the logarithm of the likelihood function in Equation (3) can be written as $$\ln p \propto -\ln\left|\frac{1}{2}(\Gamma_0 + E\Gamma_0^* E)\right|, \quad (4)$$

Therefore, the persymmetric maximum likelihood estimate of the temporal correlation matrix A 330 can be determined by minimizing the determinant of $$K(N-P)(\Gamma_0 + E\Gamma_0^* E)/2$$

To determine the persymmetric maximum likelihood estimate of the matrix A, we define $$A = E_B A^* E, \text{ where}$$

$$E_B = I_P \otimes E, \text{ where}$$

where $I_P$ is a P by P identity matrix.

According to embodiments of the invention, the persymmetric estimate 420 of the autocorrelation of $x_k(n)$ 421 is given by $$\hat{R}_{xx,P} = (\hat{R}_{xx} + E\hat{R}_{xx}^* E)/2 \quad (5)$$

According to the invention, the persymmetric estimate 430 of the autocorrelation of the regression vector $y_k(n)$ 431 is given by $$\hat{R}_{yx,P} = (\hat{R}_{yx} + E_B E\hat{R}_{yx}^* E)/2 \quad (6)$$

According to the invention, the persymmetric estimate 440 of the crosscorrelation of $y_k(n)$ and $x_k(n)$ 441 is given by $$\hat{R}_{yy,P} = (\hat{R}_{yy} E_B \hat{R}_{yy}^* E_B)/2 \quad (7)$$

As a result, $$K(N-P)(\Gamma_0 + E\Gamma_0^* E)/2 \quad (8)$$

can be rewritten as $$= \hat{R}_{xx,P} + A^H \hat{R}_{yx,P} + \hat{R}_{yx,P}^H A + A^H \hat{R}_{yy,P} A$$

$$= \left(A^H + \hat{R}_{yx,P}^H \hat{R}_{yy,P}^{-1}\right)\hat{R}_{yy,P}\left(A^H + \hat{R}_{yx,P}^H \hat{R}_{yy,P}^{-1}\right)^H +$$

$$\left(\hat{R}_{xx,P} - \hat{R}_{yx,P}^H \hat{R}_{yy,P}^{-1} \hat{R}_{yx,P}\right).$$

It follows that $$(\Gamma_0 + E\Gamma_0^* E)/2 \geq (\Gamma_0 + E\Gamma_0^* E)/2\big|_{A=-\hat{R}_{yx,P}^H \hat{R}_{yy,P}^{-1}} = \quad (9)$$

$$\frac{\hat{R}_{xx,P} - \hat{R}_{yx,P}^H \hat{R}_{yy,P}^{-1} \hat{R}_{yx,P}}{K(N-P)}$$

The persymmetric estimate of the temporal correlation matrix A 330 is $$\hat{A}_{PML} = -\hat{R}_{yy,P}^{-1} \hat{R}_{yx,P}, \quad (10)$$

and the persymmetric estimate of the spatial correlation matrix Q 340 is $$\hat{Q}_{PML} = \frac{\hat{R}_{xx,P} - \hat{R}_{yx,P}^H \hat{R}_{yy,P}^{-1} \hat{R}_{yx,P}}{K(N-P)}. \quad (11)$$

The resulting test statistic 380 for the persymmetric PAMF is $$T_{Per-PAMF} = \frac{\left|\sum_{n=P}^{N-1} \hat{s}_P^H(n)\hat{Q}_{PML}^{-1} \hat{x}_{0,P}(n)\right|^2}{\sum_{n=P}^{N-1} \hat{s}_P^H(n)\hat{Q}_{PML}^{-1} \hat{s}_P(n)} \underset{H_0}{\overset{H_1}{\gtrless}} \gamma Per - PAMF, \quad (12)$$

where γPer-PAMF is the threshold used by the threshold comparator 390. The threshold is a preset probability of false alarm.

The temporally whitened steering vector $\tilde{\hat{s}}_P$ and the temporally whitened test signal $\tilde{\hat{x}}_{0,P}$ are obtained as $$\tilde{\hat{s}}_P = s(n) + \sum_{p=1}^{P} \hat{A}_{PML}^H(p)s(n-p), \quad (13)$$

and $$\tilde{\hat{x}}_{0,P} = x_0(n) + \sum_{p=1}^{P} \hat{A}_{PML}^H(p)x_0(n-p). \quad (14)$$

The test statistic 380 is compared to a threshold 390 to decide 395 whether the target is present or not.

Figure 5:
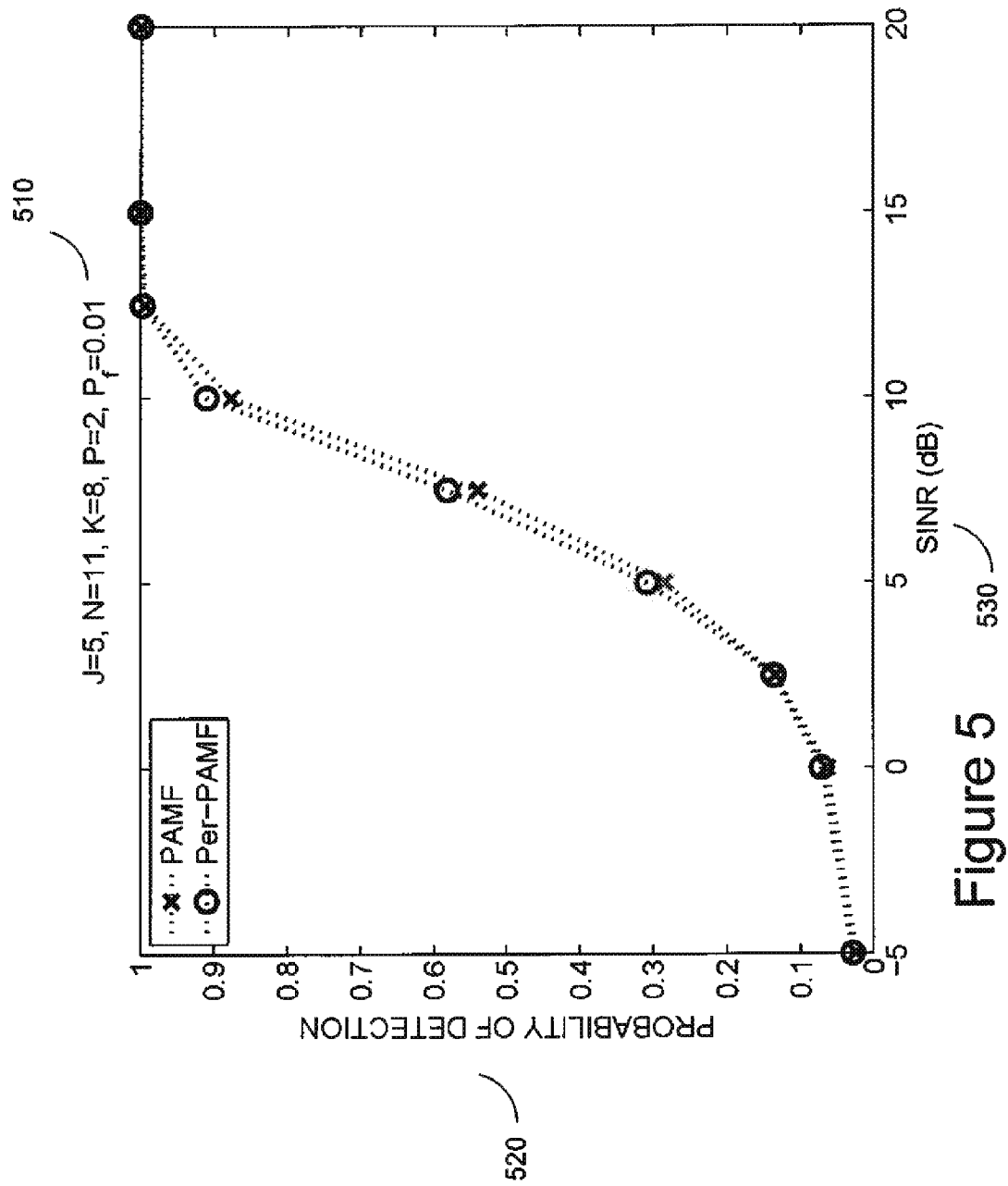
FIG. 5 is a graph comparing a probability of detection performances of the prior art PAMF and the persymmetric PAMF according to embodiments of the invention at various SINR 530, given five antenna elements (J=5), eleven pulses (N=11), eight training signals (K=8), regression order of two (P=2) and a probability of false alarm of 0.01 ($P_f$=0.01)
Figure 6:
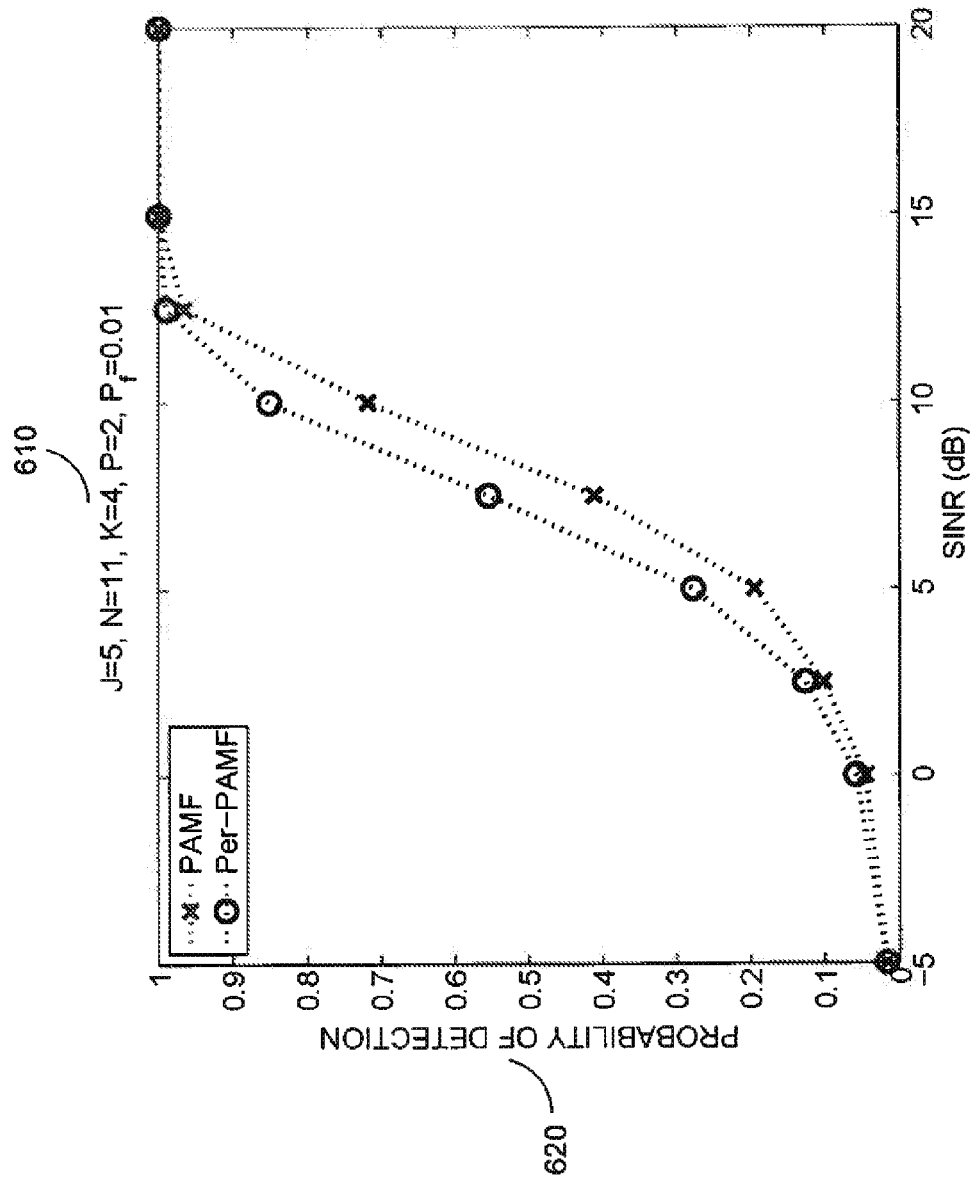
FIG. 6 is a graph of a probability of detection performances of the prior art PAMF and the persymmetric PAMF according to embodiments of the invention at various SINR 630, given five antenna elements (J=5), eleven pulses (N=11), four training signals (K=4), regression order of two (P=2) and a probability of false alarm of 0.01 ($P_f$=0.01)
Figure 7:
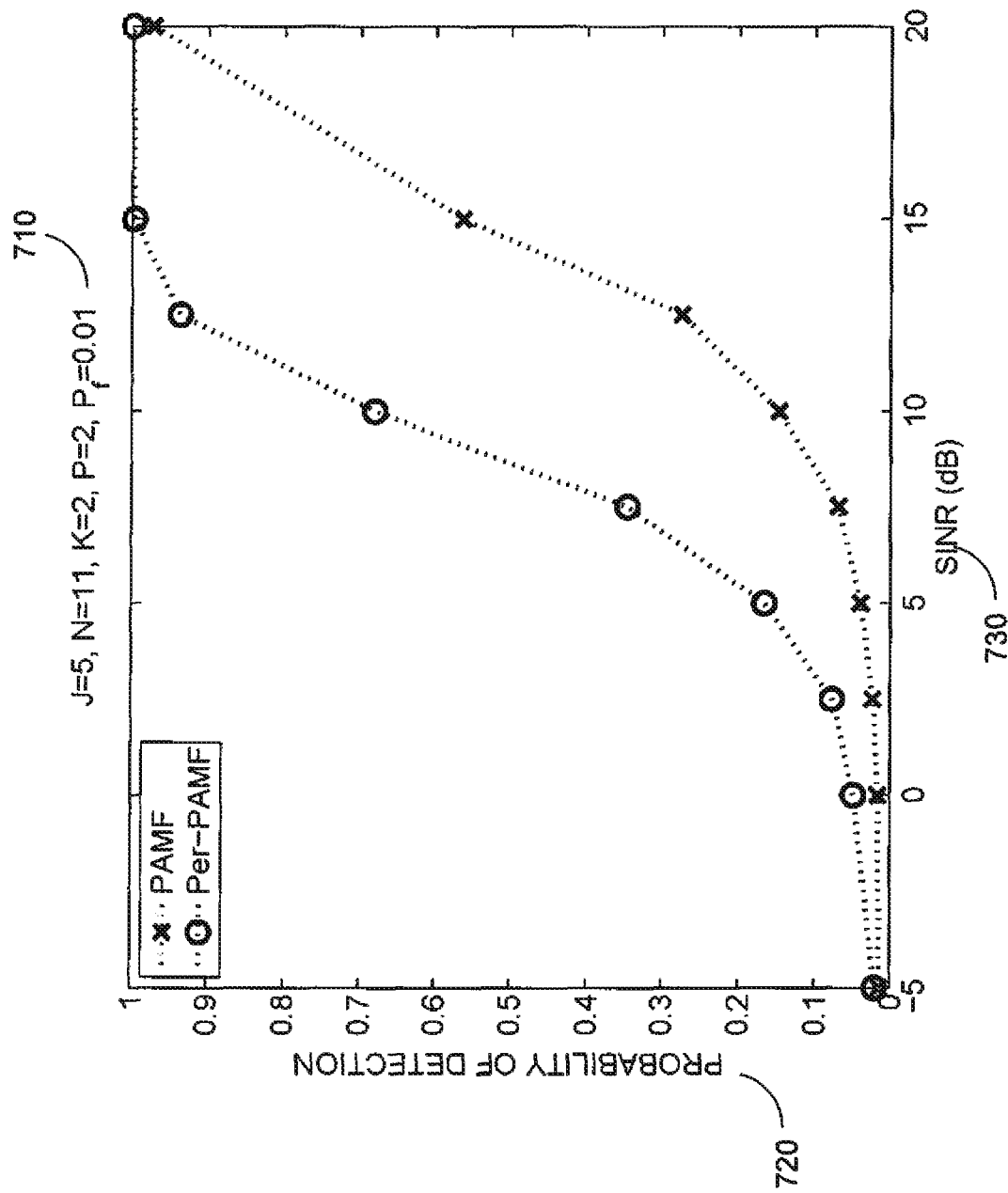
FIG. 7 is a graph of a probability of detection performances of the prior art PAMF and the persymmetric PAMF according to embodiments of the invention at various SINR 730, given five antenna elements (J=5), eleven pulses (N=11), 2 training signals (K=2), regression order of two (P=2) and a probability of false alarm of 0.01 ($P_f$=0.01).

Performances of the persymmetric PAMF according to embodiments of the invention are shown in FIGS. 5, 6 and 7.

In FIG. 5, the settings 510 are as follows: the number of antenna elements J=5, the number of pulses N=11, the number of training signals K=8, regression order of P=2, and the probability of false alarm is $P_f$=0.01. At signal to interference and noise ratio (SINR) 530 varying from −5 dB to 20 dB, the persymmetric PAMF has a higher probability of detection 520 performance than that of the prior art PAMF method.

in FIG. 6, the setting 610 as shown the number of antenna elements J=5, the number of pulses N=11, the number of training signals K=4, regression order of P=2 and the probability of false alarm is $P_f$=0.01. At signal to interference and noise ratio 630 varying from −5 dB to 20 dB, the persymmetric PAMF has a much higher probability of detection 620 performance than that of the prior art PAMF method. In this limited training case, the performance difference between per-PAMF and PAMF increases.

In FIG. 7, the setting 710 are as follows, the number of antenna elements J=5, the number of pulses N=11, the number of training signals K=2, regression order of P=2 and the probability of false alarm is $P_f$=0.01. At signal to interference and noise ratio 730 varying from −5 dB to 20 dB, the persymmetric PAMF has a dramatically higher probability of detection 720 performance than that of the prior art PAMF method.

EFFECT OF THE INVENTION

The invention improves a detection performance of multichannel receivers, and, in particular, to improve the detection of signals masked by the presence of partially correlated Gaussian or non-Gaussian noise plus additive Gaussian thermal white noise. The present invention can be used in radar, sonar, geophysical, and biomedical applications.

The embodiments of the invention use a multichannel-AR-based parametric adaptive matched filter (PAMF), and an underlying persymmetry to provide a persymmetric PAMF (per-PAMF). The per-PAMF is determined from the PMF by replacing the correlation matrices A and Q with maximum likelihood (ML) estimates obtained from the training signals under the persymmetric constraints.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. An apparatus for detecting a moving target using radar signals, comprising:
   a radar system emitting the radar signals as training signals and test signals; wherein the radar system further comprises:
   a persymmetric parametric adaptive matched filter (per-PAMF) wherein the per-PAMF system is configured to determine an estimated spatial correlation matrix $\hat{Q}$ and an estimated temporal correlation matrix $\hat{A}$ using space-time adaptive processing, wherein a spatial correlation matrix A and a temporal correlation matrix Q are known from the training signals, and the per-PAMF is configured to determine a generalized likelihood ratio test (GLRT)

$$T = \frac{\max_{\alpha} p_1(x_0; \alpha, A, Q)}{p_0(x_0; A, Q)},$$

where $\{Pi\}^1_{i=0}$ are likelihood functions under a first hypothesis $H_0$ that the target is present and a second hypothesis $H_1$ that the target is not present in the test radar signals, $\alpha$ is an unknown complex-values amplitude of the test radar signals, $x_0$ represents the test signals, and max is a function that evaluates to a maximum, and the per-PAMF is configured to determine a maximum likelihood (ML) of the spatial correlation matrix Q as $\hat{Q}$ and the temporal correlation matrix A as $\hat{A}$, wherein the correlation matrix Q is subject to a persymmetric constraint, and the per PAMF is configured to replace the spatial correlation matrices A and the temporal correlation matrix Q in the GLRT with $\hat{Q}$ and $\hat{A}$.

* * * * *